No. 861,976. PATENTED JULY 30, 1907.
J. H. HARRINGTON.
WHEEL.
APPLICATION FILED MAR. 3, 1906.
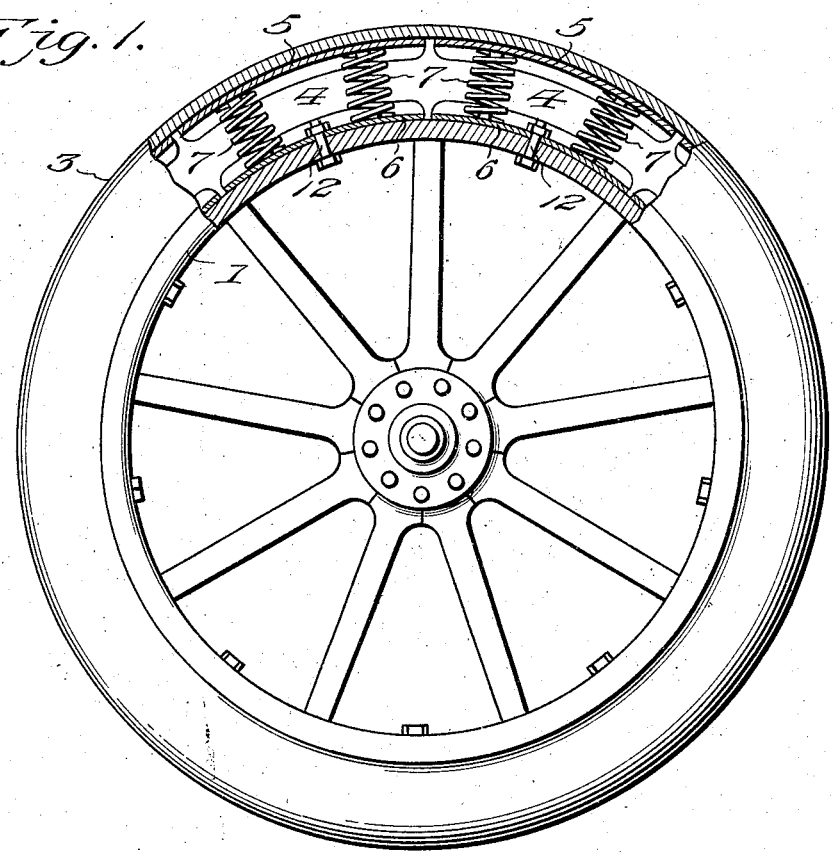
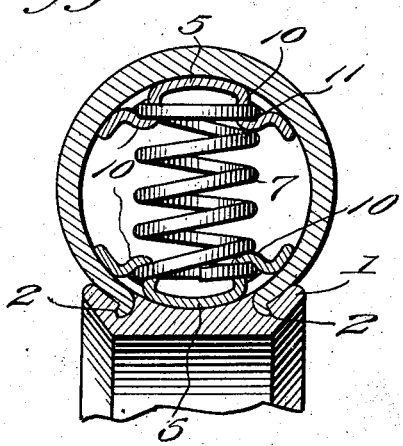
WITNESSES:
Edwin G. McKee
D. W. Gould
INVENTOR
John H. Harrington
BY Victor J. Evans
Attorney

UNITED STATES PATENT OFFICE.

JOHN H. HARRINGTON, OF NEW BEDFORD, MASSACHUSETTS.

WHEEL.

No. 861,976.      Specification of Letters Patent.      Patented July 30, 1907.

Application filed March 3, 1906. Serial No. 304,011.

*To all whom it may concern:*

Be it known that I, JOHN H. HARRINGTON, a citizen of the United States, residing at New Bedford, in the county of Bristol and State of Massachusetts, have invented new and useful Improvements in Wheels, of which the following is a specification.

The invention relates to an improvement in wheels, and particularly to a means for providing an elastic or yieldable tire therefor.

The main object of the present invention is the provision of means adapted to be secured to the felly of the wheel and primarily arranged to be protected by a suitable covering, whereby to provide a wheel having in effect a pneumatic tire constructed to avoid the necessity of inflation and practically non-collapsible under ordinary circumstances.

The invention will be described in the following specification, reference being had particularly to the accompanying drawings, in which:—

Figure 1 is a view in side elevation, partly in section, showing a wheel constructed in accordance with my invention, Fig. 2 is an enlarged transverse section through the tire and felly, Fig. 3 is a plan of one of the bearing plates of one of the resilient sections of my improved wheel.

Referring particularly to the drawings my improved wheel in its essential details may be in any preferred construction so far as the hub, spokes and felly are concerned, though I prefer that the felly 1 be formed with the usual circumferential retaining grooves 2, designed to receive the tread section 3 of the usual pneumatic tire, it being understood that as usually constructed said section, commonly called the outer tube, is removably secured in the groove and is adapted to contain an inner tube arranged for suitable inflation to secure the necessary elastic bearing of the outer tube. In carrying out the present invention, however, the inner tube is wholly dispensed with, and in its place I provide a series of resilient sections 4, secured to the felly of the wheel and sufficient in number to extend circumferentially of said felly, as shown. These sections are in exact duplicate, each comprising an outer bearing plate 5, an inner bearing plate 6, and duplicate weight resisting coil springs 7. Each bearing plate is particularly constructed to receive and permit the connection thereto of the coil springs 7, being for this purpose formed near each end with two sets of openings 8 and 9, each set including two openings arranged in alinement longitudinally of the bearing plate and the openings of one set being in alinement with the respective openings of the other set transverse of said plate, all as clearly shown in Fig. 3. The openings of each set are spaced a short distance apart longitudinally of the plate and the neck 10 joining said openings is off-set from the plane of the plate, being bent inward away from the bearing surface of the plate to provide a depression 11, between the openings, whereby said openings are connected by a channel, which when the sections are assembled and in place on the felly projects away from the bearing surface of the respective plates 5 and 6 toward the center of the tire, as clearly shown in Fig. 2.

The springs 7 are secured to the respective plates by passing the end coil of said springs successively through the openings 8 and 9 of each set at one end of the plate, the openings 8 and 9 of each set at one end of the plate, so that a portion of said coil bears beneath the plate and the remainder on the upper side of the plate, the latter portion resting within the channels 11, hereinbefore referred to, so that while the terminal coil of the spring bears upon opposite sides of the respective plates, no portion of said coil projects beyond the bearing surface of the particular plate, thereby avoiding obstruction on said bearing surface for obvious reasons.

Each of the bearing plates 4 and 5 are, of course, to be curved longitudinally to conform to the curvature of the wheel, and transversely to conform to the transverse curvature of the tire. The sections are secured in place through the medium of a bolt 12 passed through the felly of the wheel and to the lower bearing plates 6 of the section, the opening in said plate for the reception of the bolt being preferably arranged in the longitudinal and transverse center of the plate, approximately intermediate the bearing points of the springs 7, as clearly shown in Fig. 1.

By preference the sections are spaced a slight distance apart circumferentially of the felly, and the outer bearing plate 5 is preferably of somewhat greater length than the inner bearing plate with the springs secured to the respective plates at approximately the same distance from their ends, whereby said springs when in place project radially from the felly to afford the maximum resistance, as will be understood.

After the sections are secured in place the outer tube 3 of the tire, which may be of any usual or preferred construction or material, is placed in position, bearing directly upon the surfaces of the outer bearing plates 5. The wheel as constructed will, of course, require no inflation, and is not susceptible of collapse under ordinary circumstances, it being noted that the breaking of either of the springs of any particular section will not interfere materially with the resiliency of the tire as a whole, as the remaining sections are independent and will serve to support the tread surface in approximately proper relative position to the felly under such circumstances.

The particular connection of the springs 7 of the bearing plates is important in that it dispenses with the usual soldering or other fixed means for securing the springs in place, providing, however, for a comparatively secure connection between said springs and plates and while at the same time permitting the ready disconnection of any particular spring from the plates for renewal or repair.

The tire as a whole is of simple construction, and readily adapted for use with the wheels now in use, requiring simply the elimination of the usual inner tube and the substitution therefor of the resilient sections described.

Having thus described the invention what is claimed as new, is:—

1. In a vehicle wheel an elastic tire comprising a flexible tread section of approximately cylindrical form and a series of resilient sections arranged intermediate the tread section and the felly of the wheel, said resilient sections comprising spaced bearing plates and intermediate springs removably connected to said plates, said plates being each formed with spaced longitudinally arranged channels to receive the end coils of said springs, one of the plates bearing directly upon and being secured to the felly of the wheel.

2. In a vehicle wheel an elastic tire comprising a flexible tread section and a series of resilient sections arranged intermediate the tread section and the felly of the wheel, said resilient sections comprising spaced bearing plates and intermediate springs removably connected to said plates, said plates being formed with longitudinally alined openings arranged in pairs in alinement transverse of the plates to permit the passage of the end coils of the springs through said plates, whereby to secure each end coil at two points equally spaced on opposite sides of the longitudinal center of the plate, the material of the plates joining said opening being projected relative to the surface of the plate to avoid the projection of the spring beyond the surface of the plate when in place.

In testimony whereof, I affix my signature in presence of two witnesses.

JOHN H. HARRINGTON.

Witnesses:
 WINCHESTER R. SMITH,
 J. EDWARD JOHNSON.